United States Patent [19]

Gonze et al.

[11] Patent Number: 5,700,514
[45] Date of Patent: Dec. 23, 1997

[54] LOZENGES COMPRISING BINDER AND ERYTHRITOL OR MALTITOL AS SWEETENER AND PROCESS OF MAKING

[75] Inventors: Michel Henri André Gonze, Brussels; Freddy Maurits Luc Van Der Schueren, Aalst; André Léon Ivon Rapaille, Knokke-Heist, all of Belgium

[73] Assignee: Cerestar Holding B.V., Netherlands

[21] Appl. No.: 935,553

[22] Filed: Aug. 26, 1992

[30] Foreign Application Priority Data

Aug. 29, 1991 [GB] United Kingdom .................. 9118486

[51] Int. Cl.$^6$ ..................................................... A23G 3/00
[52] U.S. Cl. ..................... 426/660; 426/506; 426/520; 426/548; 426/573; 426/576
[58] Field of Search ..................... 426/660, 573, 426/506, 520, 576, 548, 658

[56] References Cited

U.S. PATENT DOCUMENTS

| | | | |
|---|---|---|---|
| 241,486 | 5/1881 | Garniner et al. | 426/576 |
| 3,809,756 | 5/1974 | Bush et al. | 426/660 |
| 4,097,616 | 6/1978 | Guillou et al. | 426/548 |
| 4,311,722 | 1/1982 | Vink et al. | 426/660 |
| 4,497,846 | 2/1985 | Bourseier et al. | |
| 5,017,400 | 5/1991 | Olinger et al. | 426/660 |
| 5,063,080 | 11/1991 | Kruger et al. | |

FOREIGN PATENT DOCUMENTS

| | | |
|---|---|---|
| 2002959 | 5/1990 | Canada . |
| 0037278 | 3/1981 | European Pat. Off. . |
| 0094292 | 4/1983 | European Pat. Off. . |
| 0398279 | 5/1990 | European Pat. Off. . |
| 0431995 | 11/1990 | European Pat. Off. . |

OTHER PUBLICATIONS

Lees et al. 1985: Sugar Confectionery and Chocolate Manufacture, Leonard Hill, Great Britain. pp. 293, 294.

Richmond, W. 1954. *Choice Confections*. Manufacturing Confectioner Publishing Co., 418 N. Austin Boulevard, Oak Park, Illinois, p. 377.

*Primary Examiner*—Helen Pratt
*Attorney, Agent, or Firm*—Cushman Darby & Cushman IP Group of Pillsbury Madison & Sutro, LLP

[57] ABSTRACT

A lozenge contains a binder such as gelatine and a sweetener which is partly or totally erythritol or maltitol. A process for making the lozenge comprises kneading the erythritol or maltitol at an elevated temperature, e.g. 35° to 60° C., while slowly adding an aqueous solution of the binder, kneading the erythritol or maltitol and binder into a smooth paste, forming the paste into suitable shapes and heating the shapes at an elevated temperature, e.g. 40° to 45° C., to harden them.

5 Claims, No Drawings

LOZENGES COMPRISING BINDER AND ERYTHRITOL OR MALTITOL AS SWEETENER AND PROCESS OF MAKING

The present invention relates to lozenges particularly to lozenges which have a reduced calorie content and which are essentially non-cariogenic.

Lozenges are a form of confectionary usually made from a sugar which has been reduced to state of fineness and which is kneaded into a doughy consistency with water and a binding agent, commonly a gum such as gum arabic. While still plastic the dough is cut into suitable shapes which are dried and allowed to harden. The lozenge, which may also contain a suitable flavour, colour and/or acid, should have a hard and brittle consistency.

An increasing interest in reduced calorie products as an aid to healthy living has created a market for lower calorie confectionary which in effect means replacing the sugar by a lower calorie sweetener of the same or similar bulk sweetness. One group of products which have been suggested for this purpose are the sugar alcohols notably erythritol, xylitol, sorbitol, mannitol, maltitol and commercially available mixtures of sugar alcohols such as the so-called hydrogenated starch hydrolysates which contain sorbitol, maltitol and higher oligomers of sorbitol containing 3 or more repeating units (DP>3). To a greater or lesser extent these products possess the added advantage of being less cariogenic than the conventionally used sugars, glucose and sucrose.

Although all of the sugar alcohols mentioned above have commercial applications as sweeteners they are not necessarily equivalent in all applications and, particularly in the confectionary field the contrasting demands of the various type of product require careful selection to find the correct combination of properties in the sweetener which is intended to replace part or all of the sugar.

We have carried out an investigation with the aim of producing a lozenge having a lower calorie content than the conventional sugar-based lozenges but which otherwise is indistinguishable therefrom and we have found that this aim may be achieved, with associated processing advantages, by replacing part or all of the sugar by erythritol or maltitol. These two polyols have been found to have unique properties in lozenge formulations which make them significantly better than alternative sweeteners, better even than the available mixtures of sugar alcohols which have maltitol as the major component.

Accordingly, the invention comprises a lozenge which contains a sweetener and a binding agent and which is characterised by part or all of the sweetener being erythritol or maltitol.

The maltitol should be at least 95% pure, preferably at least 98% pure and particularly at least 99% pure. Commercially available maltitol-containing products in which the maltitol concentration is up to 90% by weight based on dry substance are not suitable to produce lozenges in accordance with the present invention.

Erythritol, which is available commercially as the product of a fermentation process is a highly crystalline, essentially pure product which has a sweetness which is approximately 70% that of sucrose and is both non-caloric and non-cariogenic.

The binding agent which is used to make the lozenges in accordance with the present invention may be chosen from those binding agents which are customarily used in the production of sugar lozenges. For instance, the binding agent may be a natural gum such as gum arabic or may be a product such as gelatin.

The amounts of binder and sweetener in the compositions used to make the lozenges are preferably 0.2 to 3.0% by weight binder and 98.0 to 71.0% by weight erythritol or maltitol together with 1.8 to 26.0% by weight water. During the production of the lozenges most of the water is driven off leaving a product containing 0.2 to 6.0% preferably 0.2 to 3% by weight water.

The preparation process involves slowly adding the binding agent and water to the sweetener in a suitable kneader/mixer while maintaining an elevated temperature of, for example, 35° to 60° C., preferably 40° to 50° C. Mixing is continued after the completion of the addition until the mixture is a smooth homogeneous paste. The paste is then removed from the kneader/mixer, rolled-out and cut into suitable shapes which are finally "stoved" at an elevated temperature of, for example, 40° to 50° C. to harden the lozenges before packing. One advantage of the present invention is that the stoving time may be considerably reduced in comparison with that required for sugar-based lozenges and may be in the range 8 to 24 hours.

As with the sugar-based lozenges the lozenges in accordance with the present invention may contain a suitable flavour, colour and/or acid.

The invention will now be further illustrated by reference to the following Examples in which the method of preparation of the lozenges was as follows:

A Z-blade mixer was pre-heated to 40° to 45° C. and 1500 grams of the sweetener under test was introduced. A 10% by weight gelatin solution, heated to 50° C., was slowly added to the sweetener while the latter was kneaded. Varying amounts of the aqueous gelatin solution were added in this way depending upon the sweetener in question and kneading/mixing was continued for ten minutes after the addition in order to obtain a smooth, homogeneous paste. The paste was next removed from the mixer, rolled-out and cut into shapes before being stoved at 45° C. to harden the lozenges. The quality of the lozenges was evaluated by measuring their hardness with an Instron hardness tester and their hygroscopicity by their water uptake after a given time under 65% relative humidity. The results obtained for various sweeteners were as follows:

| Sweetener | mls Gelatin solution added | Hardness (grams) after stoving at 45° C. for: | | | | Hygroscopicity % after: | | | | |
| --- | --- | --- | --- | --- | --- | --- | --- | --- | --- | --- |
| | | 8 hours | 16 hours | 20 hours | 24 hours | 0 days | 3 days | 6 days | 8 days | 13 days |
| Erythritol | 230 | 1060 | 1160 | 1260 | 1320 | 0.11 | 0.11 | 0.11 | 0.11 | 0.11 |
| Maltitol (99% pure) | 150 | 580 | 860 | 980 | 1080 | 0.03 | 0.03 | 0.05 | 0.05 | 0.06 |
| Icing sugar | 135 | 560 | 620 | 690 | 790 | −0.18 | −0.20 | −0.21 | −0.21 | −0.21 |

The hardness of each of the above products after five weeks storage was:

| Erythritol | 1140 | 1200 | 1380 | 1760 |
| Maltitol | 560 | 920 | 1020 | 1140 |
| Icing sugar | 820 | 860 | 900 | 1040 |

Analogous sweeteners were also used in the above formulation in an attempt to produce lozenges. Palatinit and an hydrogenated starch hydrolysate containing 85% by weight maltitol based on dry substance both gave mixtures which proved impossible to knead in the Z-blade mixer while a lozenge made from lactitol required a stoving time of 40 hours, a significant process disadvantage. As may be seen from the above results the lozenge made from erythritol required the shortest stoving time and produced a product with a very hard finish. The maltitol based lozenge while requiring a longer stoving time than the erythritol-based product did produce a lozenge which was harder than the comparable sugar product.

We claim:

1. A process for producing a lozenge containing a sweetener and a binding agent in which the sweetener consists essentially of at least one member of the group consisting of erythritol and maltitol, said process comprising:

a. kneading the sweetener at a temperature in the range 35° to 60° C. while slowly adding an aqueous solution of the binding agent thereto, b. kneading the sweetener and the binder into a smooth, homogenous paste, c. forming the paste into a lozenge, and d. heating the lozenge at a temperature in the range 40° to 50° C. to harden it, the amounts of binder and sweetener in the composition used to make the lozenge being 0.2 to 3.0 and 98.0 to 71.0% by weight, respectively, together with 1.8 to 26.0% water.

2. A process according to claim 1 in which the binding agent is gelatin or gum arabic.

3. A process according to claim 1 or claim 2 in which the temperature in step (a) is 40° to 50° C.

4. A process according to claim 1 or claim 2 in which the time of heating in step (d) is in the range of 8 to 24 hours.

5. A lozenge manufactured by the process of claim 1 or claim 2.

* * * * *